(12) United States Patent
Toft et al.

(10) Patent No.: US 10,836,147 B2
(45) Date of Patent: Nov. 17, 2020

(54) LAMINATED PACKAGING MATERIAL, PACKAGING CONTAINERS MANUFACTURED THEREFROM AND A METHOD FOR MANUFACTURING THE LAMINATE MATERIAL

(71) Applicant: TETRA LAVAL HOLDINGS & FINANCE S.A., Pully (CH)

(72) Inventors: Nils Toft, Lund (SE); Katarina Jonasson, Bjärred (SE); Peter Öhman, Lund (SE); Andrew Horvath, Eslöv (SE)

(73) Assignee: TETRA LAVAL HOLDINGS & FINANCE S.A., Pully (CH)

( * ) Notice: Subject to any disclaimer, the term of this patent is extended or adjusted under 35 U.S.C. 154(b) by 0 days.

(21) Appl. No.: 16/616,830

(22) PCT Filed: May 31, 2018

(86) PCT No.: PCT/EP2018/064366
§ 371 (c)(1),
(2) Date: Nov. 25, 2019

(87) PCT Pub. No.: WO2018/220132
PCT Pub. Date: Dec. 6, 2018

(65) Prior Publication Data
US 2020/0094536 A1 Mar. 26, 2020

(30) Foreign Application Priority Data
May 31, 2017 (EP) ..................................... 17173854

(51) Int. Cl.
*B32B 1/02* (2006.01)
*B32B 27/10* (2006.01)
(Continued)

(52) U.S. Cl.
CPC ............ *B32B 27/10* (2013.01); *B29C 65/022* (2013.01); *B32B 1/02* (2013.01); *B32B 1/08* (2013.01);
(Continued)

(58) Field of Classification Search
CPC .. B32B 1/02; B32B 1/08; B32B 27/10; B32B 29/00; B32B 29/002; B32B 23/00;
(Continued)

(56) References Cited

U.S. PATENT DOCUMENTS

2017/0120556 A1  5/2017  Nyman et al.

FOREIGN PATENT DOCUMENTS

RU   2 230 694 C2   6/2004
WO   9946121 A1    9/1999
(Continued)

OTHER PUBLICATIONS

International Search Report (PCT/ISA/210) dated Aug. 29, 2018, by the European Patent Office as the International Searching Authority for International Application No. PCT/EP2018/064366.
(Continued)

*Primary Examiner* — Walter Aughenbaugh
(74) *Attorney, Agent, or Firm* — Buchanan Ingersoll & Rooney PC

(57) ABSTRACT

The present invention relates to a laminated liquid food packaging material, comprising a cellulose-based bulk material layer and outer layers of thermoplastic polymers on both sides, having a décorative print pattern arranged beneath one of the outer thermoplastic polymer layers. The invention further relates to the method for manufacturing the laminated packaging material and to a packaging container for liquid food packaging, comprising the laminated packaging material.

20 Claims, 8 Drawing Sheets

Figure 1A:
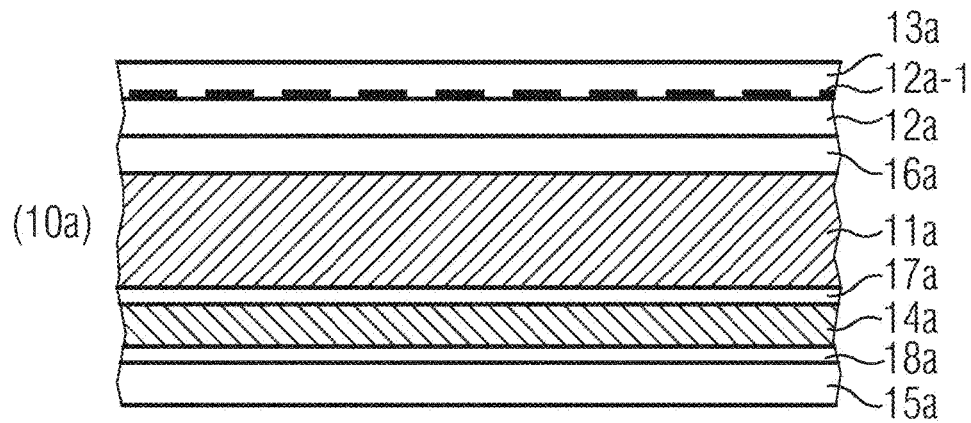

(51) Int. Cl.
*B32B 37/12* (2006.01)
*B32B 27/32* (2006.01)
*B32B 1/08* (2006.01)
*B32B 29/00* (2006.01)
*B32B 37/15* (2006.01)
*B65H 81/00* (2006.01)
*B32B 23/00* (2006.01)
*B29C 65/02* (2006.01)
*B32B 23/06* (2006.01)
*B32B 23/08* (2006.01)
*B32B 7/12* (2006.01)

(52) U.S. Cl.
CPC .............. *B32B 23/00* (2013.01); *B32B 23/06* (2013.01); *B32B 23/08* (2013.01); *B32B 27/32* (2013.01); *B32B 29/00* (2013.01); *B32B 29/002* (2013.01); *B32B 37/12* (2013.01); *B32B 37/1284* (2013.01); *B32B 37/153* (2013.01); *B65H 81/00* (2013.01); *B32B 7/12* (2013.01); *B32B 2255/26* (2013.01); *B32B 2307/31* (2013.01); *B32B 2307/7244* (2013.01); *B32B 2439/70* (2013.01)

(58) Field of Classification Search
CPC ......... B32B 23/06; B32B 23/08; B32B 37/12; B32B 37/1284; B32B 37/153; B32B 37/203; B29C 65/022; B65H 81/00
See application file for complete search history.

(56) References Cited

FOREIGN PATENT DOCUMENTS

| WO | 00/30846 A1 | 6/2000 | |
|---|---|---|---|
| WO | 2011/003566 A1 | 1/2011 | |
| WO | WO 2011/003566 | * 1/2011 | ............ B32B 27/10 |
| WO | 2015181281 A1 | 12/2015 | |
| WO | 2017089506 A1 | 6/2017 | |

OTHER PUBLICATIONS

Written Opinion (PCT/ISA/237) dated Aug. 29, 2018, by the European Patent Office as the International Searching Authority for International Application No. PCT/EP2018/064366.

Search Report dated Apr. 2, 2020, by the Russian Patent Office in corresponding Russian Patent Application No. 2019143668/05(084613). (2 pages).

* cited by examiner

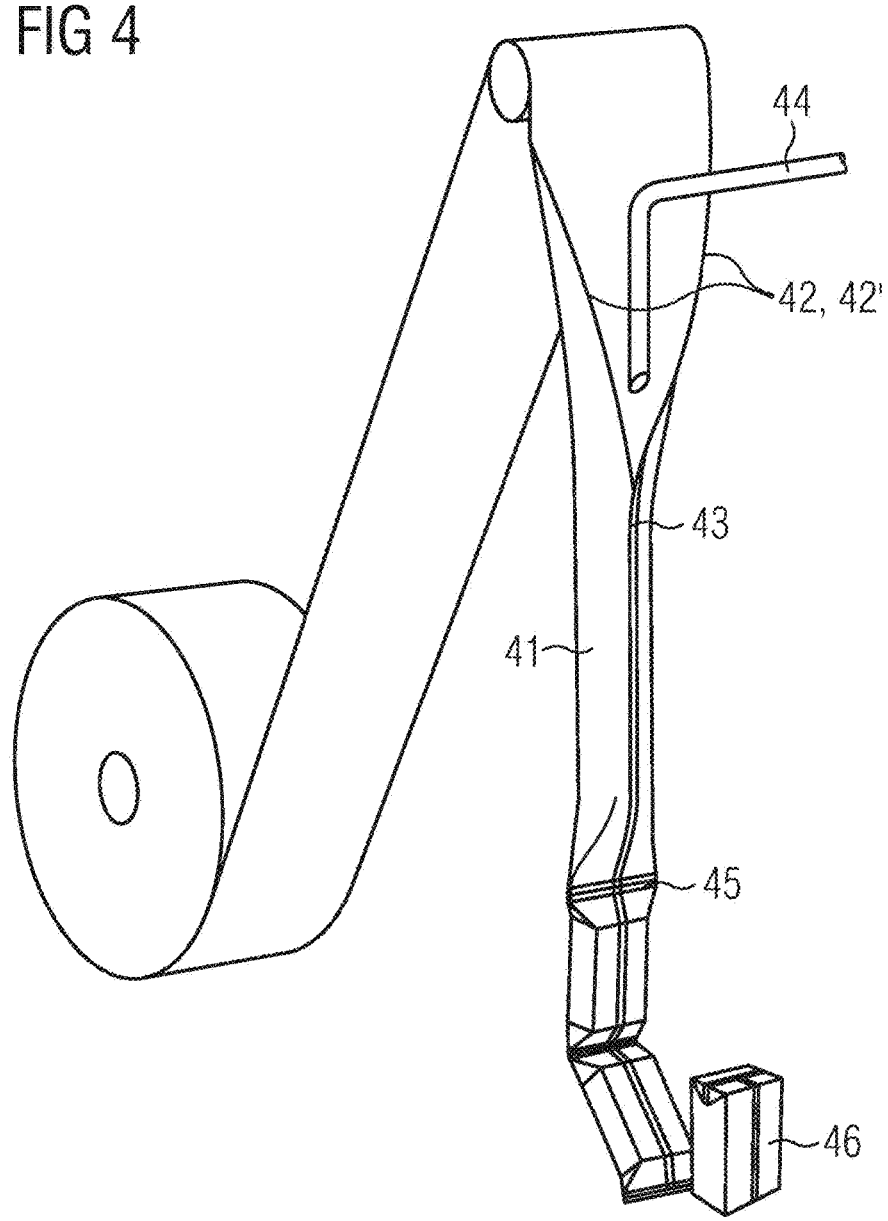

LAMINATED PACKAGING MATERIAL, PACKAGING CONTAINERS MANUFACTURED THEREFROM AND A METHOD FOR MANUFACTURING THE LAMINATE MATERIAL

TECHNICAL FIELD

The present invention relates to a laminated packaging material comprising a bulk layer of paper or carton or other cellulose-based material and outer layers of thermoplastic polymers on both sides, having a printed décor arranged beneath one of the outer thermoplastic polymer layers.

Furthermore, the invention relates to packaging containers comprising the laminated packaging material or being made of the laminated packaging material, as well as to a method for manufacturing of the laminated material.

BACKGROUND

Packaging containers of the single use disposable type for liquid foods are often produced from a packaging laminate based on paperboard or carton. One such commonly occurring packaging container is marketed under the trademark Tetra Brik Aseptic® and is principally employed for aseptic packaging of liquid foods such as milk, fruit juices etc, sold for long term ambient storage. The packaging material in this known packaging container is typically a laminate comprising a bulk layer of paper or paperboard and outer, liquid-tight layers of thermoplastics. In order to render the packaging container gas-tight, in particular oxygen gas-tight, for example for the purpose of aseptic packaging and packaging of milk or fruit juice, the laminate in these packaging containers normally comprises at least one additional layer, most commonly an aluminium foil.

On the inside of the laminate, i.e. the side intended to face the filled food contents of a container produced from the laminate, there is an innermost layer, applied onto the aluminium foil, which innermost, inside layer may be composed of one or several part layers, comprising heat sealable thermoplastic polymers, such as adhesive polymers and/or polyolefins. Also on the outside of the bulk layer, there is an outermost heat sealable polymer layer.

The packaging containers are generally produced by means of modern, high-speed packaging machines of the type that form, fill and seal packages from a web or from prefabricated blanks of packaging material.

Packaging containers may thus be produced by reforming a web of the laminated packaging material into a tube by both the longitudinal edges of the web being united to each other in an overlap joint by welding together the inner- and outermost heat sealable thermoplastic polymer layers. The tube is filled with the intended liquid food product and is thereafter divided into individual packages by repeated transversal seals of the tube at a predetermined distance from each other below the level of the contents in the tube. The packages are separated from the tube by incisions along the transversal seals and are given the desired geometric configuration, normally parallelepipedic or cuboid, by fold formation along prepared crease lines in the packaging material.

The main advantage of this continuous tube-forming, filling and sealing packaging method concept is that the web may be sterilised continuously just before tube-forming, thus providing for the possibility of an aseptic packaging method, i.e. a method wherein the liquid content to be filled as well as the packaging material itself are reduced from bacteria and the filled packaging container is produced under clean conditions such that the filled package may be stored for a long time even at ambient temperature, without the risk of growth of micro-organisms in the filled product. Another important advantage of the Tetra Brik®-type packaging method is, as stated above, the possibility of continuous high-speed packaging, which has considerable impact on cost efficiency.

Typically many thousands of packages may be prepared per hour. For example the Tetra Pak® A3/speed may manufacture about 15 000 packages per hour (family-size packaging containers of 0.9 liters and above), and about 24 000 packaging containers per hour (portion packages).

Packaging containers for sensitive liquid food, for example milk or juice, can also be produced from sheet-like blanks or prefabricated blanks of the laminated packaging material of the invention. From a tubular blank of the packaging laminate that is folded flat, packages are produced by first of all building the blank up to form an open tubular container capsule, of which one open end is closed off by means of folding and heat-sealing of integral end panels. The thus closed container capsule is filled with the food product in question, e.g. juice, through its open end, which is thereafter closed off by means of further folding and heat-sealing of corresponding integral end panels. An example of a packaging container produced from sheet-like and tubular blanks is the conventional so-called gable-top package. There are also packages of this type which have a moulded top and/or screw cap made of plastic.

The known packaging laminate is conventionally produced from a web of paper or paperboard which is unwound from a storage reel, while at the same time a web of aluminium foil is unwound from a corresponding storage reel. The two unwound webs are brought together with each other and are both guided through the nip between two adjacent rotatable cylinders, while at the same time a bonding layer of a laminating material, usually low-density polyethylene (LDPE), is extruded into a molten polymer film or polymer curtain, which is thus applied between the webs to permanently bind the aluminium foil web to the paper or paperboard web. The paper or paperboard web is thereafter provided on both sides with liquid-tight coatings of polyethylene, normally low-density polyethylene (LDPE), and is then wound up on finished packaging reels for onward transport and handling.

The known packaging material works very well and fulfils several important functions in the packages produced therefrom, such as protecting the food towards ingress of substances and microbes from the outside of the package, and from decay due to light or oxygen gas. It is since long the packaging material structure most often seen on the retailers' shelves today. The bulk layer of a liquid-grade paperboard allows high-quality flexographic or off-set printing of an attractive printing décor with high colour control and resolution on its outer surface. The printable surface of the paperboard is normally coated with a white coating composition of mineral particles and binder polymers, which provides a neutral and consistent background to any printed colour décor pattern with required adhesion and cohesion properties within the coating and towards the printed ink and any adjacent polymer layers.

Decreasing the costs of today's packaging material further, can be made by down-gauging the thickness of the polymer layers or by seeking to replace the aluminium foil barrier by one or more different barrier layers. A different way of saving costs, which has hitherto not been considered practical in the field of liquid carton packaging, would be by down-gauging the cellulose-based bulk layer by type and/or amount of cellulose fibre material. It normally leads to the important properties of mechanical strength and packaging integrity, as well as material barrier properties, being jeopardized and has hitherto been a less favourable way forward. The paperboard is a major part of liquid carton packaging material, however also representing a major part of the total packaging material costs.

A further requirement on future laminated packaging materials for liquid packaging containers is that the appearance of such packaging containers should be possible to differentiate to a higher degree, i.e. by providing new, interesting and appealing decorative or tactile features to attract consumers and retailers. Such features are for example, background effects to printed décor patterns such as gold metallisation or other different shiny colours, embossing and engraving features such as hologram decorations, tactile or relief surface effects, matte/glossy surfaces, etc. The increasing desire for such differentiation options is a challenge, since additions of features and materials normally, entail higher costs of raw materials and/or manufacturing processes.

Any change to the existing paperboard material entails costly development at the paper manufacturer's, because paperboard manufacturing is a very complex process. This has not hitherto been considered worth the efforts and resources, since the major part of liquid carton packages produced still would be chosen to have the state of the art, reliable and consistent, white coating background. An increasing need for further variation and differentiation from the conventional liquid cartons is seen, however, which increases demands on adaptation and flexibility of the packaging material produced.

SUMMARY

It is accordingly, a general object of the present invention to provide a laminated packaging material at lower cost, having good mechanical properties and fulfilling the needs in liquid carton laminated packaging materials.

A further general object is to provide a laminated packaging material, with increased opportunity for differentiation of the outside appearance of packages made from the laminated material, in comparison to the state of the art packaging material and packaging containers described above.

It is a further object to provide a laminated cellulose-based packaging material at reduced or at least maintained cost, having increased opportunity for outside differentiation and sufficient mechanical strength and dimensional stability as well as good print surface properties, to fulfil the needs in liquid carton laminated packaging materials.

It is a specific object to enable cost-efficient differentiation of the outside layers of such a laminated packaging material, i.e. the visible decorative layer which will attract and appeal to consumers, to enable late customization of the outside of a packaging container in the packaging material manufacturing process, and in shorter series of manufactured packaging material.

A further object, is to provide a laminated cellulose-based packaging material based on a down-gauged, low-cost bulk or core layer, which does not have a suitable surface for a printed decorative pattern, but a rough, dark or brown surface, the final packaging material still having comparable print quality to conventional such packaging laminates, and opportunities for differentiation.

Some or all of these objects are attainable according to the present invention by the laminated packaging material, the method of manufacturing the laminated packaging material as well as the packaging container made therefrom, as defined hereinafter and in the appended claims.

According to a first aspect of the invention, there is thus provided a laminated, liquid food packaging material, comprising a cellulose-based bulk material layer, an outermost, transparent and protective thermoplastic polymer layer arranged on the outside of the bulk material layer, i.e. on the side to be directed to the exterior of a packaging container made from the laminated material, a decorative print pattern arranged beneath, i.e. inside of, and visible through the outermost transparent and protective thermoplastic polymer layer, an innermost, heat sealable and liquid-tight thermoplastic polymer layer, to be in direct contact with the liquid food in the packaging container, wherein the bulk material layer is a Containerboard, which has been calendered to a Bendtsen outside surface roughness value lower than 200 ml air/min, and has an SCT index greater than 30 Nm/g in MD as determined in accordance with ISO 9895 and ISO 536 and a bending stiffness at least 30% lower than that of a liquid packaging board of a corresponding surface weight, excluding any printable coating (clay-coat) thereof, and wherein the laminated packaging material further comprises a cellulose-based print substrate paper, having an outside print surface carrying the decorative print pattern, the print substrate paper being adhered to the outer side of the bulk material layer by means of 1-4 g/m$^2$ adhesive, dry weight, and having a surface weight of 100 g/m$^2$ or lower (ISO 536), the outside print surface having a Bendtsen surface roughness value lower than 100 ml air/min (ISO 8791-2).

By such an arrangement, a cheaper bulk material layer may be used instead of the conventional high-end liquid packaging paperboard.

At the same time, the outside layers may easily be exchanged, such that different decorative, visible and/or tactile features may be laminated into the material, according to different styles and wishes among customers, consumers and retailers. Such customisation makes it possible to produce separate, shorter series of differently decorated and tailor-made packaging materials, without creating stoppages, waste and logistics problems in the main stream of the material manufacturing line, i.e. enabling late customization of the packaging material. Furthermore, such late customisation makes it possible to choose from a list or catalogue of available paper and paperboard grades, to provide combinations of bulk layers and print substrate papers that provide a desired stiffness and mechanical dimension stability in a laminated material, as needed for a particular package size and type of food product, as well as a desired print background appearance with good printability properties.

The different background features and appearances of a print substrate paper could be, silver- and gold-metallic appearance or other different metallic colours, embossed and engraved features, tactile or relief surface effects, matte/glossy surfaces, etc. The increasing desire for such differentiation options is a challenge, since additions of features and materials normally, automatically entail higher costs of raw materials and/or manufacturing processes. By moving the print surface part of the normally used paperboard material layer to a separate layer, which has the complementary mechanical properties for supporting the remainder of the bulk properties of the remaining bulk material layer, as well as providing differentiated features and a good printable surface, the same functionalities are achieved in the final laminated packaging material as of prior art packaging materials. At the same time, some of the costs spent on different high-end outside print substrate papers, may be compensated by savings on the bulk material layer.

In a second aspect of the invention, a packaging container for packaging of liquid food comprising the laminated packaging material of the invention is provided. The packaging container may be made entirely from the laminated packaging material, by fold-forming a sheet- or web-shaped blank into a cuboid, another fold-shaped package or merely into a pouch package.

In a third aspect of the invention, a method for manufacturing the laminated cellulose-based, liquid food packaging material as defined above, comprises the steps, in any order, of a) providing a first web of a cellulose-based bulk material layer (A), being a calendered Containerboard having a Bendtsen outside surface roughness value lower than 200 ml air/min, an SCT index greater than 30 Nm/g in MD as determined in accordance with ISO 9895 and ISO 536 and a bending stiffness at least 30% lower than that of a liquid packaging board of a corresponding surface weight, excluding any printable coating (clay-coat) thereof, outside meaning the side to be directed to the exterior of a packaging container made from the laminated material, b) providing a second web of a cellulose-based print substrate paper (B), having a surface weight of 100 g/m² or lower (ISO 536), and an outside print surface to carry a decorative print pattern, with a Bendtsen surface roughness value lower than 100 ml air/min (ISO 8791-2), c) applying an aqueous adhesive composition comprising an adhesive polymer at an amount from 1 to 4 g/m², dry content, onto at least one of the outside of the first web and the inside of the second web, inside meaning directed to the interior of said packaging container, d) forwarding the first and second webs, from step c), towards a pressure roller nip (22), to be joined and laminated together by the interjacent aqueous adhesive composition while passing the nip, and while the aqueous adhesive composition is partly absorbed into the surface of at least one of the first and second webs (A and B), e) printing a décorative print pattern onto the print surface of the print substrate paper, f) laminating an innermost heat sealable thermoplastic polymer layer on the inner side of the web of the bulk material layer, opposite the side of the print substrate paper, innermost meaning in contact with the liquid food in said packaging container, g) laminating an outermost, transparent and protective thermoplastic polymer layer on the outer side of the web of the print substrate paper, i.e. on the outside print surface, opposite the side of the bulk material layer.

The step e) may be carried out before steps c) and d), such that the print substrate paper is first printed with the décor onto its print surface in a separate printing operation.

Normally, the print substrate paper is laminated to the bulk material layer before it is further subjected to a printing operation. Suitable printing methods may be modern digital and ink-jet printing methods, but may also be traditional flexography printing methods and off-set printing methods.

The surface roughness of the print substrate paper when laminated to the bulk material layer, will be approximately the same after the printing of the decorative print pattern, as before the printing operation. Normally, if any change, it should be to a higher smoothness of the printed print substrate paper, since the paper may pass several print rollers and nips before being finally printed. Thus, the outside print surface of the print substrate paper, also when laminated to the bulk material layer, has a smoothness lower than 100 ml air/min (Bendtsen).

The bulk material layer has preferably been calendered to an outside surface roughness lower than 200 ml air/min (Bendtsen), such as lower than 150 ml air/min.

By this method, late customization of material is possible, by late combination of bulk material layer and print substrate paper for the suitable mechanical properties depending on package size and type, and it is also possible to customize late regarding which printed décor to deliver, depending on the customer brand and type of product to be filled into the packaging containers.

DETAILED DESCRIPTION

With the term "long-term storage" in connection with the present invention, is meant that the packaging container should be able to preserve the qualities of the packed food product, i.e. nutritional value, hygienic safety and taste, at ambient conditions for at least 1 or 2 months, such as at least 3 months, preferably longer, such as 6 months, such as 12 months, or more.

With the term "package integrity", is generally meant the package durability, i.e. the resistance to leakage or breakage of a packaging container. It encompasses the resistance of the package to intrusion of microbes, such as bacteria, dirt, and other substances, that may deteriorate the filled food product and shorten the expected shelf-life of the package.

One main contribution to the integrity of a package from a laminated packaging material is provided by good internal adhesion between adjacent layers of the laminated material. Another contribution comes from the material resistance to defects, such as pinholes, ruptures and the like within each material layer itself, and yet another contribution comes from the strength of the sealing joints, by which the material is sealed together at the formation of a packaging container. Regarding the laminated packaging material itself, the integrity property is thus mainly focused on the adhesion of the respective laminate layers to its adjacent layers, as well as the quality of the individual material layers. Regarding the sealing of the packages, the integrity is mainly focussed on the quality of the sealing joints, which is ensured by well-functioning and robust sealing operations in the filling machines, which in turn is ensured by adequately adapted heat-sealing properties of the laminated packaging material.

The term "liquid food" generally refers to food products having a flowing content of low or high viscosity, that optionally may contain pieces of food. Dairy and milk, soy, rice, grains and seed drinks, juice, nectar, still drinks, energy drinks, sport drinks, coffee or tea drinks, coconut water, tea drinks, wine, soups, crushed tomatoes, sauce (such as pasta sauce) and olive oil are some non-limiting example of food products contemplated.

The term "aseptic" in connection with a packaging material and packaging container refers to conditions where microorganisms are eliminated, in-activated or killed. Examples of microorganisms are bacteria and spores. Generally an aseptic process is used when a product is aseptically packed in a packaging container. For the continued asepticity during the shelf-life of the package, the package integrity properties are of course very important. For long-term shelf-life of a filled food product, it may furthermore be important that he package has barrier properties towards gases and vapours, such as towards oxygen gas, in order to keep its original taste and nutritional value, such as for example its vitamin C content.

With the term "bulk layer" is normally meant the thickest layer or the layer containing the most material in a multi-layer laminate, i.e. the layer which is contributing most to the mechanical properties and the dimensional stability of the laminate and of packaging containers folded from the laminate, such as paperboard or carton. It may also mean a layer providing a greater thickness distance in a sandwich structure, which further interacts with stabilising facing layers, which have a higher Young's modulus, on each side of the bulk layer, in order to achieve sufficient such mechanical properties and dimensional stability.

A "spacer layer" is thus a layer that creates a distance or space between significantly thinner material layers in a sandwich construction, which have a higher Young's modulus and density, such as an oriented film, metal foil or a high-density, high-tensile stiffness paper layer, foil or film, arranged on each side of the spacer layer, i.e. stiffness- and stability-providing layers, so-called facing layers. The spacer layer may have a lower or reduced inherent bending stiffness and thus does not itself contribute much directly to the bending stiffness of a laminated packaging material. Indirectly, it may contribute very much, however, by the interaction with adjacent or laminated layers on both sides, some of the layers having a higher Young's modulus but a lower thickness in comparison to the spacer layer. In a sandwich construction, it is important that there is at least one such facing layer, or stiffness-enhancing layer on each side of the spacer layer. A "bulk layer" may thus comprise a "spacer layer" and a further combined layer within the bulk, but may also be the same as a spacer layer.

The term "heat-sealing" refers to the process of welding one surface of a thermoplastic material to another thermoplastic surface. A heat-sealable material should, under the appropriate conditions such as applying sufficient heating and pressure, be able to generate a seal when pressed against and in contact with another suitable thermoplastic material. Suitable heating can be achieved by induction heating or ultrasonic heating or other conventional contact or convection heating means, e.g. hot air or impulse heating. Upon heating, the mobility of the polymer chains increase at the material surfaces intended for sealing to each other, such that the chains disentangle and move and re-entangle with polymer chains from the opposite sealing surface. Upon cooling there are created strong bonds of entangled polymer chains across the sealing interface, thus bonding the two material surfaces to each other. The heat sealing operation has to occur within parts of a second and the duration of the different phases, such as heating, partly melting, bonding and cooling, is counted in milliseconds, in packaging machines that produce thousands of packages per hour.

The term "inner" as defining a position, or side of a layer, in a laminated packaging material has the meaning "directed towards the inside of a packaging container formed from the packaging material", and the term "outer" defines the direction towards the exterior or outside of a packaging container formed from the packaging material".

"Innermost" means the layer that is in contact with the packed product in a packaging container formed from the packaging material.

"Outermost" means the layer that provides the outer, external surface of a packaging container formed from the packaging material.

The print surface of the print substrate paper may have a Cobb absorption value, measured in accordance with ISO 535, from 22 to 28, such as from 24 to 27, such as from 24 to 26 g/m² of water. The cellulose composition of the print substrate paper needs to be sized, to resist edge wicking, i.e. to resist absorption of water or liquid at the exposed paper edges of a cut laminate structure, and to resist too much absorption of water from the aqueous adhesive composition in the lamination operation, laminating the print substrate paper to the bulk material layer. A Cobb value above 30 would mean that the paper absorbs too much of the aqueous composition, which results in a weaker bond from the aqueous adhesive absorption lamination. The cut edges of the laminate also absorb the aqueous composition such that the laminated material swells and delaminates along the exposed edge areas. On the other hand, at too low Cobb values, such as below 20, there may be problems in adhering a printed ink to the print substrate paper, and to further coat the printed paper with a thermoplastic polymer layer. Preferred Cobb values on the print substrate paper are thus from 24 to 26 g/m² of water, to balance absorption vs adhesion properties.

The sizing is suitably an internal, dual sizing, i.e. two kinds of sizing agents are added to the cellulose pulp in the manufacturing of the paper from the pulp. Suitable such dual sizing agents are alkylketene dimer (AKD) together with Rosin (Hartz). AKD may alternatively be used as a single sizing agent. Another possible sizing agent is alkylene succinic anhydride (ASA).

Sizing is done by adding from 1 to 4 kg/ton, such as from 2 to 4 kg/ton of sizing agent(s) to the cellulose pulp, i.e. from 0.1 (0.2) to 0.4 weight-%.

The print surface may have a Bendtsen surface roughness value of below 80 ml air/min, such as below 60 ml air/min, such as below 70 ml air/min. The smoother the better resulting print quality. Further, the print substrate paper may have a surface weight lower than 80 g/m², such as lower than 70 g/m².

The print substrate paper may have a tensile strength index (GM) of at least 40 Nm/g, to better cope with the forces applied in the lamination processes. Furthermore, for this purpose, it may have a tear strength index of at least 6 mNm²/g.

More specifically, the print substrate paper may have a density higher than 650 kg/m³, a surface weight of 100 g/m² or lower (ISO 536), a tensile strength index (GM) of at least 40 Nm/g, a tear strength index (GM) of at least 6.0 mNm²/g, and comprising at least one sizing agent at from 0.1 to 0.4 wt-%, the outside print surface having a Bendtsen surface roughness value lower than 100 ml air/min (ISO 8791-2), and a Cobb value greater than 20 g/m² and lower than 30 g/m² (water).

The print substrate paper may thus be a paper having a smooth printable surface selected from the group consisting of MG (Machine Glazed) paper, MF (Machine Finished) paper, LWC (Light-weight coated) paper, Flexible Packaging paper, metallization base paper, digital printing paper, copy paper and ink jet printing paper.

MG paper is paper having a high-gloss finish on one side, produced by allowing the wet paper web to dry against a highly-polished metal cylinder, also called a Yankee cylinder or Yankee dryer, of a paper machine. MG paper may be MG Kraft paper, and may be very thin papers, often used as wrapping papers and posters. The surface roughness may be from 40 to 150 ml air/min, Bendtsen. For the present invention, MG papers of surface roughness below 100 ml/min would be selected.

MF paper has a similarly smooth surface to MG papers, but is obtained by calendering on a paper machine with a final smoothening machine roller treatment.

LWC paper is a category of paper, acknowledged in the paper industry, which has a thin white coating and is partly based on mechanical pulp and used for example for weekly magazines.

Flexible packaging paper is another category of suitable papers, acknowledged in the paper industry, having a smooth surface, and which only contains chemical pulp. It is normally a one-side coated thin Kraft paper, but may alternatively be un-coated. This kind of paper is often used e.g. for food packaging. An example of a suitable product name is Lennoflex from Feldmuehle. The term "Flexible" distinguishes the paper type from inflexible carton (bending mode). The Surface Roughness of Flexible Packaging papers can be as low as about 15 ml air/min.

Metallisation base paper is manufactured and pre-coated to provide a smooth surface for metallization. Such papers may be used in the present invention both as metallised print substrate papers and as non-metallised print substrate papers. Examples of suitable metallisation base paper products are "Lennovac" and "Metalvac".

Digital printing paper, ink-jet papers and copy papers are all surface treated on both sides to provide a smooth surface, adapted to receive various printing inks, by different printing processes.

The surface of the print substrate paper may have any colour, metallization colour or pattern or be white, to serve as background to a subsequently printed décor. In one embodiment, the print substrate paper is natural brown, i.e. unbleached brown paper.

In an embodiment, the print substrate paper is metallized, i.e. carrying a nano-meter thin metallization coating. Regarding metallised print substrate papers, the metallised surface is sensitive to being laminated to a rough surface on the backside, such that the metal-shining, mirror-like smooth appearance of the metallised surface is disturbed, and thereby in turn deteriorating or disturbing a décor print, subsequently printed onto the surface. Therefore, it is important for metallised print substrate papers to be laminated to a sufficiently smooth surface, beneath the print substrate paper, i.e. on the opposite side to the metallization coating. Especially for metallised print substrate papers, the surface roughness of the underlying surface of the bulk material layer should be lower than 150 ml air/min Bendtsen, such that the resulting surface roughness of the laminated print substrate paper and bulk material layer may be reduced to below 50 ml air/min.

Normally, a white print surface is still desirable, and a suitable print substrate having such a surface would be a thin printing paper suitable for digital printing or ink jet printing or for flexographic printing.

The bulk material layer may have a surface weight from 100 to 300 $g/m^2$, such as from 100 to 200 $g/m^2$.

The bulk material layer preferably has an outside surface smoothness lower than 200 ml air/min, such as lower than 150 ml air/min (Bendtsen). Containerboard having such a smooth surface cannot be found commercially, but has to be prepared by a calendaring process. Suitable calendaring processes are metal belt calendaring and heated roller calendaring. The fact that a containerboard, such as a linerboard, has been calendered before laminating into a laminated packaging material, may be detected by that the surface of the containerboard has "flames" of a different shade of the containerboard surface colour and/or surface texture. It is thus visible, when delaminating such a laminated material, that the surface of the containerboard has been treated by some high heat and pressure.

When using a print substrate paper having a determined surface weight, laminated materials for different packaging container sizes and different requirements regarding mechanical properties, may be obtained by simply exchanging the bulk material layer, which may thus be chosen from different commercial grades of liquid packaging board. For example, when using a print substrate paper of 70 $g/m^2$, a packaging laminate suitable for smaller, so-called portion packages of a size of 250 or 300 ml or less, may be obtained by laminating to a 30 mN LPB paperboard. The resulting laminate of papers acquires a bending stiffness of 80 mN, i.e. at the same level as currently commercially available LPB grades, which are aiming at the same type of smaller portion packages. If instead laminating the same print substrate paper to an 80 mN LPB paperboard, the resulting laminated material may be suitable for slightly bigger packaging containers that are normally requiring a 150 mN LPB paperboard, or for some packages requiring a 260 mN type of liquid packaging board. When instead laminating the same print substrate paper to a 150 mN LPB paperboard, the resulting laminated material may be suitable for packaging containers that are normally requiring a 260 mN LPB paperboard, i.e. for so-called family packages of volumes from 750 ml to 1000 ml. By such an arrangement, the desired mechanical properties, such as in particular the desired bending stiffness, may be achieved in the final laminated packaging material, to suit the different sizes and types of packages, by combining only a few possible paper types and a few liquid packaging paperboards. In addition, the advantage of being able to swap between different outside print substrate papers, i.e. between different outside appearances of the packages, may be achieved. A white print surface may easily be replaced by a metallised print surface, or a natural brown print surface, or any colour surface of a similar type of print substrate paper, i.e. of same density, surface weight and other mechanical properties (tensile strength, tear strength) and Cobb value.

Another example of a material suitable for a bulk material layer is so-called Containerboard, which normally has a quite high density but a lower inherent bending stiffness, as well as other differences in mechanical properties, in comparison to conventional liquid packaging paperboard, such that the dimensional and mechanical stability and thus the integrity and barrier properties of packages made from a laminate having a bulk layer of such a material, would be deteriorated, when manufactured as conventional carton packaging laminates.

Containerboard has thus a substantially lower inherent bending stiffness compared to a liquid packaging board, LPB, or to a laminated packaging material suitable for liquid packaging.

Bending stiffness is not commonly measured on containerboard materials, since they were anyway intended for corrugated carton manufacturing, but it has been measured that such materials have a bending stiffness at least 30%, such at least 40% such at least 50% lower, than the bending stiffness of a liquid carton paperboard, at a corresponding surface weight when excluding the printable coating (claycoat) surface weight. Containerboard still contributes to the total mechanical properties and bending stiffness of a laminated packaging material, however, by also providing a spacer layer, or distance layer, in a sandwich construction between facing layers, which have a higher Young's modulus, and by having higher compression strength properties in the in-plane (x-y) of the layer, than conventional LPB paperboard. Suitable such facing layers may be thin papers (as the print substrate paper) and, for example, aluminium metal foil.

Containerboard is also known as corrugated case material (CCM), and the materials needed for a containerboard or corrugated case material are a corrugated medium (or fluted medium) which is, in use, fluted (welled) and arranged in its well-shaped state by gluing between two flat linerboards or liner mediums. Such a corrugated construction provides a high sandwich structure bending stiffness, due to the fluted intermediate layer, which is acting as a distance or spacer layer between the two, relatively thinner, liner layers. The two types of paper that make up containerboard are thus linerboard material, also commonly called Kraft liner or Test liner, and fluting (or corrugating medium) material.

Generally, fluting materials have a higher bending stiffness per surface weight than linerboard materials.

Since containerboard is made mainly out of natural unbleached cellulose fibres, it is generally brown or beige, although its shade may vary depending on the type of cellulose. There are, however, also white top linerboards, which have a white top layer on one surface and which are normally more expensive materials.

Liner board normally has a density lower than 850 kg/m$^3$, such as lower than 835 kg/m$^3$, is brown or beige and comprises mainly softwood fibres, such as spruce and pine fibres. The fibre pulp from which linerboard is made, is chemical pulp.

Fluting is the paper product normally used as corrugating medium in corrugated container-paperboards, having a density from 600 to 750 kg/m$^3$, such as from 600 to 700 kg/m$^3$, normally around 650 kg/m$^3$. Fluting paper is brown or beige and contains mostly short fibres, and is generally, just like linerboard, a very low-cost, low-quality paper, that is not in itself suitable for manufacturing of liquid carton packages. However, when used as a spacer layer in a sandwich structure, it may work well for the purpose, and at a substantially lower price, if of an approved kind and combined in the right way with the right layers in such a packaging laminate.

The fluting medium would, however, in this invention, form a spacer layer, which is non-fluted, by being a lower-stiffness and lower-cost fibrous material that may provide sufficient distance in a sandwich construction for a laminated liquid carton packaging material. Fluted spacer layers, i.e. well-formed spacer layers, are not within the scope of the present invention. Corrugated carton materials would pose quite different technical implications and requirements to liquid carton laminated packaging materials, and are thus outside scope.

The fibres generally used in the manufacture of containerboard materials can be broadly classified into two main types, recycled fibres and new, i.e. virgin fibres. The properties of paper are dependent on the structural characteristics of the various fibres that compose the sheet. Generally, the higher the content of virgin fibres, the stronger and stiffer (higher compression resistance) the fluting or linerboard material will be. Birch is an optimal fluting raw material. Its structure contains high concentrations of lignin and hemicellulose. The pulping process preserves the naturally highly hydrophobic lignin and modifies the remaining hemicellulose so that the soft and flexible cellulose core of the fibre is protected. This provides a higher stiffness and resistance to creep. When used for liquid packaging, available fluting materials on the market need to be complemented with one or more additional sizing agent during pulping or cellulose web manufacturing, to cope with the liquid and high-moisture conditions for this new use and application. Conventional sizing technologies and chemicals (AKD, ASA, rosin, etc.) can be used for the fluting material to meet the necessary requirements for the specific product.

Linerboard made of virgin fibres, is called Kraft liner, whereas linerboard from recycled fibres is known as testliner. For the purpose of liquid food packaging, virgin fibres are preferred. Mixes of virgin and recycled fibres may be possible. Kraft linerboard should have at least 80 wt %, and preferably 100 wt % of virgin fibres. The fibres used for linerboard are longer than those used in fluting material, and since linerboard is originally intended for the outer, liner layers of a carton material, they are already sized with sizing agents to withstand different degrees of moisture and wet conditions.

Containerboard materials have lower bending stiffness, which is at least 30% lower (when excluding the printable coating (clay-coat) surface weight) than corresponding paperboards for liquid packaging. They have, on the other hand, a higher SCT index, i.e. a higher SCT value per surface weight unit in the machine direction (MD), than a normal liquid packaging board material, or than other paper or cellulose materials that would be suitable in this context. Generally, fluting materials have a higher bending stiffness per surface weight than linerboard materials.

The SCT value is a property measured by the international standard ISO9895, and which is relied on to compare different containerboard materials with each other. The SCT or Short Compression Test measures the internal compression resistance of paper fibres, i.e. the in-plane compression strength of a paper, in CD and MD. This property varies with the surface weight of the specific paper measured on. surface weight of paper products is measured in accordance with ISO 536.

Packages made from a material having a higher SCT index, have better stackability, and it is thus a measurement of compression strength per surface weight in the in-plane (x-y plane) of a carton material. Containerboard materials normally have an SCT index of more than 30 Nm/g in MD, and would thus provide i.a. the required compression strength and stackability properties for a liquid paperboard laminate. They do not need to be optimised regarding bending stiffness properties, since they will only be used as (non-fluted) spacer layers in laminated materials for liquid carton packaging. Thus, whereas linerboard materials originally are intended for facing layers in a corrugated carton sandwich structure, they will for the present invention be used as the spacer layer in a laminated structure, having further facing layers laminated on each side thereof, to provide the required bending stiffness properties for liquid carton laminated materials.

For comparison, today's liquid paperboard materials have a lower SCT index of about 25 Nm/g, but are then also optimised regarding all other properties, since they are relied on as the main provider of dimensional stability in liquid carton laminated packaging materials. When replacing today's optimised liquid paperboard with a low-cost spacer layer in a sandwich structure in a laminate, such a spacer layer needs to have a higher SCT index, of above 30 Nm/g, to compensate for the loss of properties when removing the state-of-the-art paperboard.

Regarding moisture resistance, these materials may have a Cobb water adsorption value of lower than 35 g/m$^2$, to function better in a liquid carton packaging laminate. The Cobb value is measured in accordance with ISO 535, and is fulfilled by most linerboard materials already, while some fluting materials may need additional sizing to be used as a non-fluted spacer layer in a liquid carton packaging laminate. Accordingly, a containerboard material in a bulk layer, comprises at least one sizing additive.

Since the new spacer layer will be laminated to further facing layers in a sandwich configuration in a laminate structure, there is no need to provide a white or smooth (e.g. clay-coated) printing surface on the spacer layer itself. Also in that respect, the container board materials are thus suitable materials for such a spacer layer.

On the other hand, container board materials have very rough surface properties, and Bendtsen surface roughness values of at least 500 ml air/min (Bendtsen).

When laminating such a rough cellulosic fibre layer as containerboard to a thin print substrate paper, the surface roughness of the containerboard, specifically the linerboard, will be transferred through the print substrate paper, such that the outer, printable surface of the print substrate paper will also become too rough to enable high quality printing of outside décors on the packaging material, even if the print substrate paper itself is smooth. At reasonable thickness of a print substrate paper it is thus difficult to produce a smooth and well-functioning print surface, if the bulk layer material is containerboard, such as linerboard. The high surface roughness causes bad print quality both when first printing onto the print substrate paper in a separate operation before laminating it to the linerboard, and when printing after having laminated the print substrate paper to the linerboard bulk material.

Consequently, the containerboard or linerboard should be modified to obtain a smoother surface on the outer side, which is directed to the outside of the laminated packaging material. A suitable modification is to calender the containerboard, such as the linerboard, by high pressure at a high surface temperature of the surface. Typically, the calendering is performed by metal belt calendering or by heated roll calendering. A suitable nip pressure for smoothening of linerboard material having a surface roughness of above 600 ml air/min, such as about 650 ml air/min, down to below 200 ml air/min, such as below 150 ml air/min, Bendtsen, is from 80 to 120 kN/m, such as about 100 kN/m and a suitable temperature of the surface to the smoothened of about 200° C., at a calender running speed from 500 to 1200, such as about 1000 m/m in. The nip area and the running speed are adjusted to apply sufficient pressure to the containerboard, for a sufficient time, to provide a smoother surface thereof.

Generally, the higher pressure and/or temperature during a certain time (calendaring speed), the smoother and glossier a surface will be the result.

An alternative method of modifying a linerboard would be to coat it with a printable coating (clay-coat) to provide the smooth printable surface. Such white, coated linerboards, having a surface roughness of from 150 to 250 ml air/min Bendtsen are available commercially, but are naturally more expensive.

The thermoplastic polymer of the innermost heat sealable layer may be a polyolefin, such as polyethylene.

Suitable thermoplastic polymers for outermost and innermost heat sealable liquid-tight layers in the laminated packaging material of the invention, are polyolefins such as polyethylene and polypropylene homo- or co-polymers, preferably polyethylenes and more preferably polyethylenes selected from the group consisting of low density polyethylene (LDPE), linear LDPE (LLDPE), single-site catalyst metallocene polyethylenes (m-LLDPE) and blends or copolymers thereof. According to a preferred embodiment, the outermost heat sealable and liquid-tight layer is an LDPE, while the innermost heat sealable, liquid-tight layer is a blend composition of m-LLDPE and LDPE for optimal lamination and heat sealing properties. The outer- and innermost thermoplastic polymers layers may be applied by (co-)extrusion coating of the molten polymer to a desired thickness. The outer- and/or innermost liquid-tight and heat sealable layers may alternatively be applied in the form of pre-manufactured, oriented or non-oriented films. According to another embodiment, the outermost heat-sealable, liquid-tight and protective thermoplastic polymer layer may be applied by means of an aqueous dispersion coating of a thermoplastic polymer, such as when only low thickness of such an outermost layer is desired, or when such a process is preferable for other reasons.

A gas barrier film or foil comprising an oxygen barrier layer or coating may be laminated on the inner side of the bulk material layer, between the bulk material layer and the innermost thermoplastic polymer layer.

It may be laminated by melt extrusion laminating of an intermediate bonding layer of a thermoplastic polymer between a web of the bulk material layer and a web of the gas barrier film or foil, and pressing together in a lamination roller nip. Alternatively, it may be laminated by application of an aqueous composition of an adhesive polymer onto one of the webs, before pressing together in a lamination roller nip, such that the adhesive composition partly migrates into the cellulose surface of the bulk material layer and adheres the two web surfaces together.

A typical barrier foil in the field of laminated liquid carton packaging materials is aluminium foil. It may have a thickness from 5 to 9 µm, such as from 5 to 6.5 µm.

Alternatively, a polymer film substrate having a barrier coating, such as a dispersion-coated or liquid-film coated barrier coating, or a vapour deposited barrier coating may be laminated there between.

Oxygen barrier properties may thus be provided by thin liquid film coatings, for example barrier polymers that are coated in the form of a dispersion or solution in a liquid medium or solvent, onto a substrate, such as a paper or polymer film substrate, and subsequently dried into thin barrier coatings. It is important that the dispersion or solution is homogeneous and stable, to result in an even coating with uniform barrier properties. Examples of suitable polymers for such aqueous liquid-film compositions with barrier properties are polyvinyl alcohols (PVOH), water-dispersible ethylene vinyl alcohols (EVOH) or polysaccharide-based water-dispersible or dissolvable polymers. Such dispersion coated, or so called liquid film coated (LFC), layers may be made very thin, down to tenths of a gram per $m^2$, and may provide high quality, homogenous layers, provided the dispersion or solution is homogeneous and stable, i.e. well prepared and mixed. PVOH has excellent oxygen barrier properties under dry conditions and provides very good odour barrier properties, i.e. capability to prevent odour substances from entering the packaging container from the surrounding environment, e.g. in a fridge or a storage room, which capability becomes important at long-term storage of packages. Furthermore, such liquid film coated polymer layers from water-dispersible or -dissolvable polymers often provide good internal adhesion to adjacent layers, which contributes to good integrity of the final packaging container.

Suitably, the polymer is selected from the group consisting of vinyl alcohol-based polymers, such as PVOH or water dispersible EVOH, acrylic acid or methacrylic acid based polymers (PAA, PMAA), polysaccharides such as for example starch or starch derivatives, cellulose nanofibrils (CNF), nanocrystalline cellulose (NCC), chitosan, hemicellulose or other cellulose derivatives, water dispersible polyvinylidene chloride (PVDC) or water dispersible polyesters, or combinations of two or more thereof.

More preferably, the polymer binder is selected from the group consisting of PVOH, water dispersible EVOH, polysaccharides such as for example starch or starch derivatives, chitosan or other cellulose derivatives, or combinations of two or more thereof.

Such barrier polymers are thus suitably applied by means of a liquid film coating process, i.e. in the form of an aqueous or solvent-based dispersion or solution which, on application, is spread out to a thin, uniform layer on the substrate and thereafter dried.

The liquid composition may additionally comprise inorganic to further improve the oxygen gas barrier properties.

The polymer binder material may for example be mixed with an inorganic compound which is laminar in shape, or flake-formed. By the layered arrangement of the flake-shaped inorganic particles, an oxygen gas molecule is forced to migrate a longer way, via a tortuous path, through the oxygen barrier layer, than the normal straight path across a barrier layer.

The inorganic laminar compound may be a so-called nanoparticle compound dispersed to an exfoliated state, i.e. the lamellae of the layered inorganic compound are separated from each other by means of a liquid medium. Thus, the layered compound preferably may be swollen or cleaved by the polymer dispersion or solution, which at dispersion has penetrated the layered structure of the inorganic material. It may also be swollen by a solvent before added to the polymer solution or polymer dispersion, or exfoliated by physical methods such as ultrasound. Thus, the inorganic laminar compound is dispersed to a delaminated state in the liquid gas barrier composition and in the dried barrier layer. There are many chemically suitable nano-clay minerals, but preferred nano-particles are those of montmorillonite, such as purified montmorillonite or sodium-exchanged montmorillonite (Na-MMT). The nano-sized inorganic laminar compound or clay mineral preferably has an aspect ratio of 50-5000 and a particle size of up to about 5 µm in the exfoliated state.

Preferably, the barrier layer includes from about 1 to about 40 weight %, more preferably from about 1 to about 30 weight % and most preferably from about 5 to about 20 weight %, of the inorganic laminar compound based on dry coating weight. Preferably, the barrier layer includes from about 99 to about 60 weight %, more preferably from about 99 to about 70 weight % and most preferably from about 95 to about 80 weight % of the polymer based on the dry coating weight. An additive, such as a dispersion stabiliser or the like, may be included in the gas barrier composition, preferably in an amount of not more than about 1 weight % based on the dry coating. The total dry content of the composition is preferably from 5 to 15 weight-%, more preferably from 7 to 12 weight-%.

According to a different preferred embodiment, the inorganic particles mainly consist of laminar talcum particles having an aspect ratio of from 10 to 500. Preferably, the composition comprises an amount of from 10 to 50 weight-%, more preferably from 20 to 40 weight-% of the talcum particles, based on dry weight. Below 20 weight-%, there is no significant increase in gas barrier properties, while above 50 weight-%, the coated layer may be more brittle and breakable because there is less internal cohesion between the particles in the layer. The polymer binder seems to be in too low an amount to surround and disperse the particles and laminate them to each other within the layer. The total dry content of such a liquid barrier composition from PVOH and talcum particles may be between 5 and 25 weight-%.

Preferably, the oxygen gas barrier layer is applied at a total amount of from 0.1 to 5 g/m$^2$, preferably from 0.5 to 3.5 g/m$^2$, more preferably from 0.5 to 2 g/m$^2$, dry weight. Below 0.1 g/m$^2$, there will be no gas barrier properties achieved at all, while above 5 g/m$^2$, the coated layer will not bring cost-efficiency to the packaging laminate, due to high cost of barrier polymers in general and due to high energy cost for evaporating off the liquid. A recognisable level of oxygen barrier is achieved by PVOH at 0.5 g/m$^2$ and above, and a good balance between barrier properties and costs is achieved between 0.5 and 3.5 g/m$^2$.

The oxygen gas barrier layer may be applied in two consecutive steps with intermediate drying, as two part-layers. When applied as two part-layers, each layer is suitably applied in amounts from 0.1 to 2.5 g/m$^2$, preferably from 0.5 to 1 g/m$^2$, and allows a higher quality total layer from a lower amount of liquid gas barrier composition. More preferably, the two part-layers are applied at an amount of from 0.5 to 2 g/m$^2$ each, preferably from 0.5 to 1 g/m$^2$ each.

According to a different embodiment, a barrier coating may be applied by means of physical vapour deposition (PVD) or chemical vapour deposition (CVD) onto a substrate surface of a film material. The substrate material itself may contribute with some properties as well, but should above all have appropriate surface properties, suitable for receiving a vapour deposition coating, and should work efficiently in a vapour deposition process.

Thin vapour deposited layers are normally merely nanometer-thick, i.e. have a thickness in the order of magnitude of nanometers, for example of from 1 to 500 nm (50 to 5000 Å), preferably from 1 to 200 nm, more preferably from 1 to 100 nm and most preferably from 1 to 50 nm.

One common type of vapour deposition coating, often having some barrier properties, such as water vapour barrier properties, is so called metallisation layers, e.g. aluminium metal physical vapour deposition (PVD) coatings.

Such a vapour deposited layer, substantially consisting of aluminium metal may have a thickness of from 5 to 50 nm, which corresponds to less than 1% of the aluminium metal material present in an aluminium foil of conventional thickness for packaging, i.e. 6.3 µm. Vapour deposition metal coatings require significantly less metal material, and normally provide a lower level of oxygen barrier properties.

Other examples of vapour deposition coatings are aluminium oxide (AlOx) and silicon oxide (SiOx) coatings. Generally, such coatings are more brittle and less suitable for incorporation into packaging materials by lamination.

Other coatings for laminated packaging materials may be applied by means of a plasma enhanced chemical vapour deposition method (PECVD), wherein a vapour of a compound is deposited onto the substrate under oxidising circumstances. Silicon oxide coatings (SiOx) by PECVD coating may, for example, obtain very good barrier properties under certain coating conditions and gas recipes.

The vapour deposition coating may alternatively be an amorphous hydrogenated carbon barrier layer applied by a plasma enhanced chemical vapour deposition process, PECVD, a so-called diamond-like carbon (DLC). DLC defines a class of amorphous carbon material that displays some of the typical properties of diamond. Preferably, a hydrocarbon gas, such as e.g. acetylene or methane, is used as process gas in the plasma for producing the coating.

The same thermoplastic polyolefin-based materials, in particular polyethylenes, as listed above regarding the outermost and innermost layers, may also be suitable in bonding layers interior of the laminated material, e.g. between the bulk material layer, and the barrier film or foil.

Other suitable adhesive polymers for extrusion lamination of bonding layers interior of the laminated material, e.g. as intermediate bonding layer between an innermost heat sealable layer and a barrier film or foil, may be so-called adhesive thermoplastic polymers, such as modified polyolefins, which are mostly based on LDPE or LLDPE copolymers or, graft co-polymers with functional-group containing monomer units, such as carboxylic or glycidyl functional groups, e.g. (meth)acrylic acid monomers or maleic anhydride (MAH) monomers, (i.e. ethylene acrylic acid copolymer (EAA) or ethylene methacrylic acid copolymer (EMAA)), ethylene-glycidyl(meth)acrylate copolymer (EG(M)A) or MAH-grafted polyethylene (MAH-g-PE). Another example of such modified polymers or adhesive polymers are so called ionomers or ionomer polymers.

Corresponding modified polypropylene-based thermoplastic adhesives or bonding layers may also be useful, depending on the requirements of the finished packaging containers.

Such adhesive polymer layers or "tie" layers may be applied together with the respective outer heat sealable layer, such as an innermost thermoplastic polymer layer, or together with further intermediate bonding layers between the bulk material layer and the aluminium metal foil, in a co-extrusion coating operation.

EAA or EMAA adhesive polymers provide for example the best possible adhesion, as an adhesion polymer layer for bonding an adjacent polyethylene layer to an aluminium foil.

The gas barrier film or foil may thus be laminated to the bulk material layer by at least one intermediate bonding layer of a polyolefin, such as polyethylene, such as low density polyethylene (LDPE) or of an adhesive polymer, such as a polyolefin-based polymer modified with hydroxylic or carboxylic functional groups, or of a blend thereof.

The gas barrier film or foil may alternatively be laminated to the bulk layer by a bonding adhesive of an acrylic-modified polyethylene copolymer, applied at an amount from 0.5 to 4 g/m$^2$, such as from 1-2 g/m$^2$, dry content. The barrier film or foil may thus be laminated to the bulk material layer with just a very low amount of an aqueous adhesive composition at a dry content of 20 to 50 weight-%, such as from 30 to 50 weight %. The aqueous adhesive composition is partly absorbed into the network of fibres of the bulk material cellulose surface, such that a low amount of adhesive polymer is applied but still laminates the surfaces together.

EXAMPLES AND DESCRIPTION OF DRAWINGS

Figure 1B:
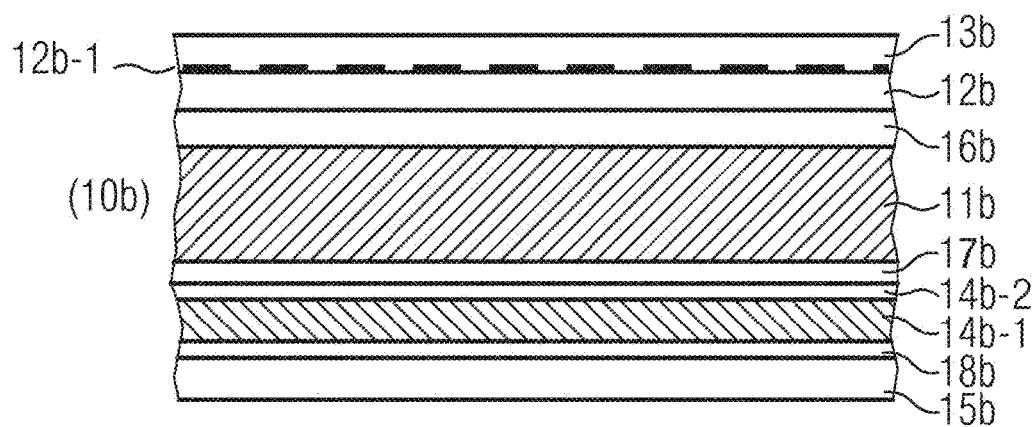
Figure 1C:
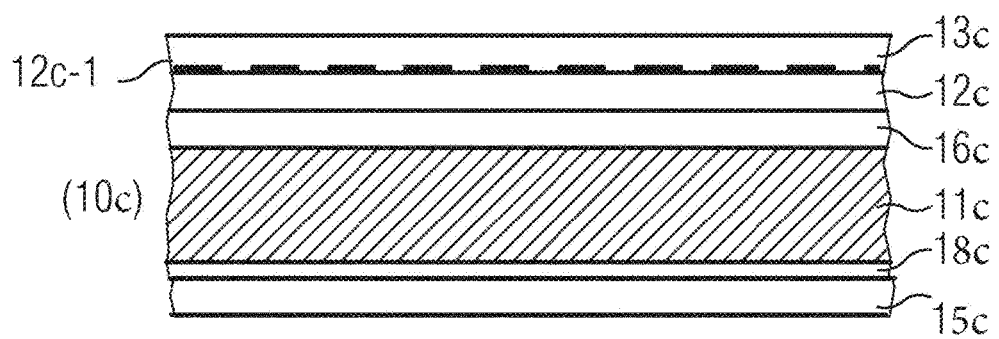
Figure 2A:
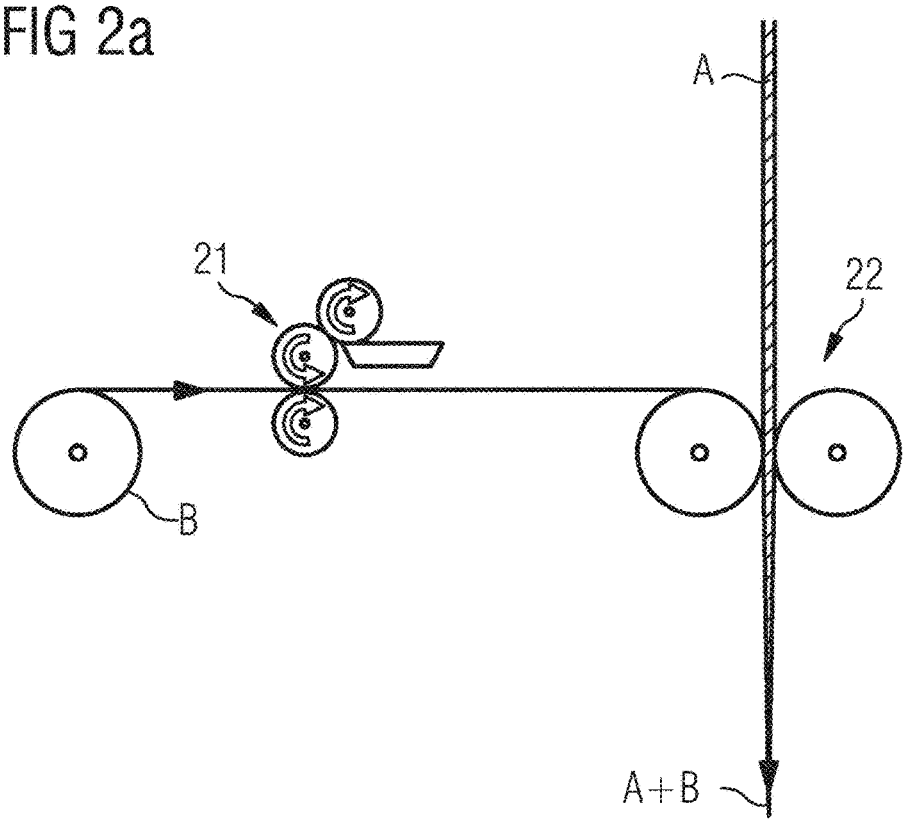
Figure 2B:
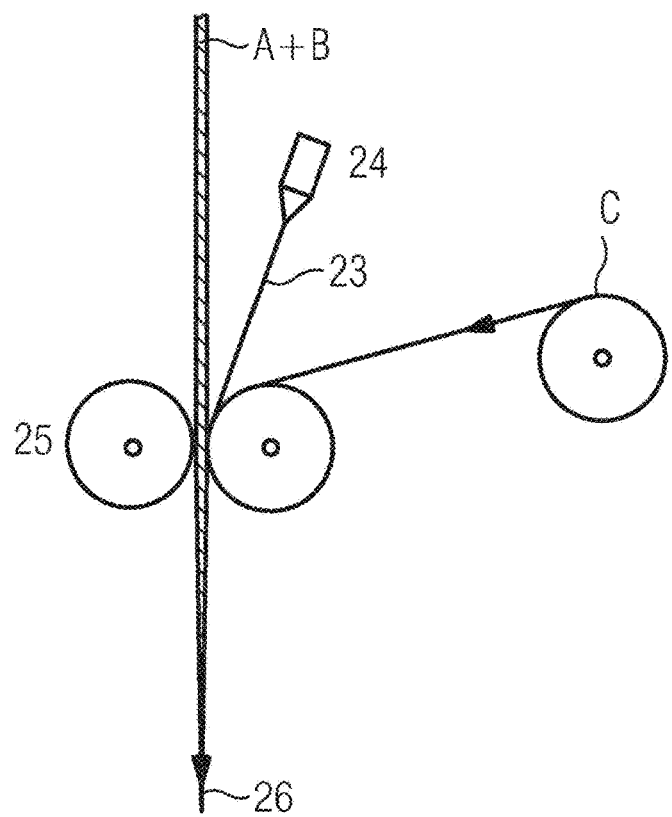
Figure 2C:
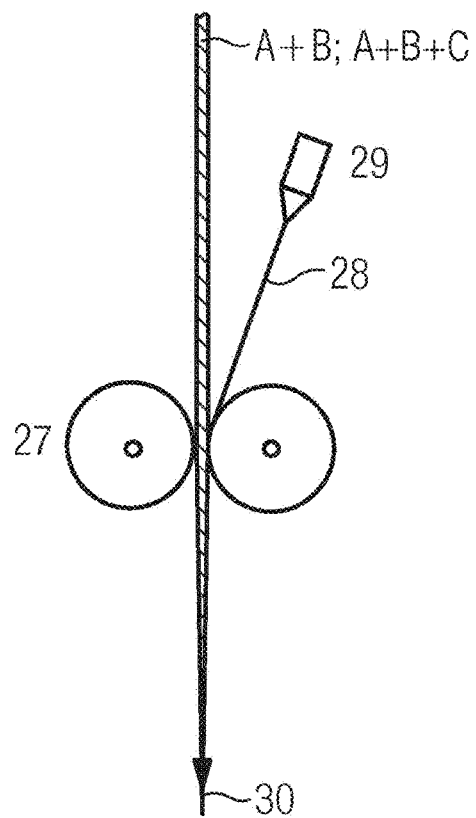
Figure 5:
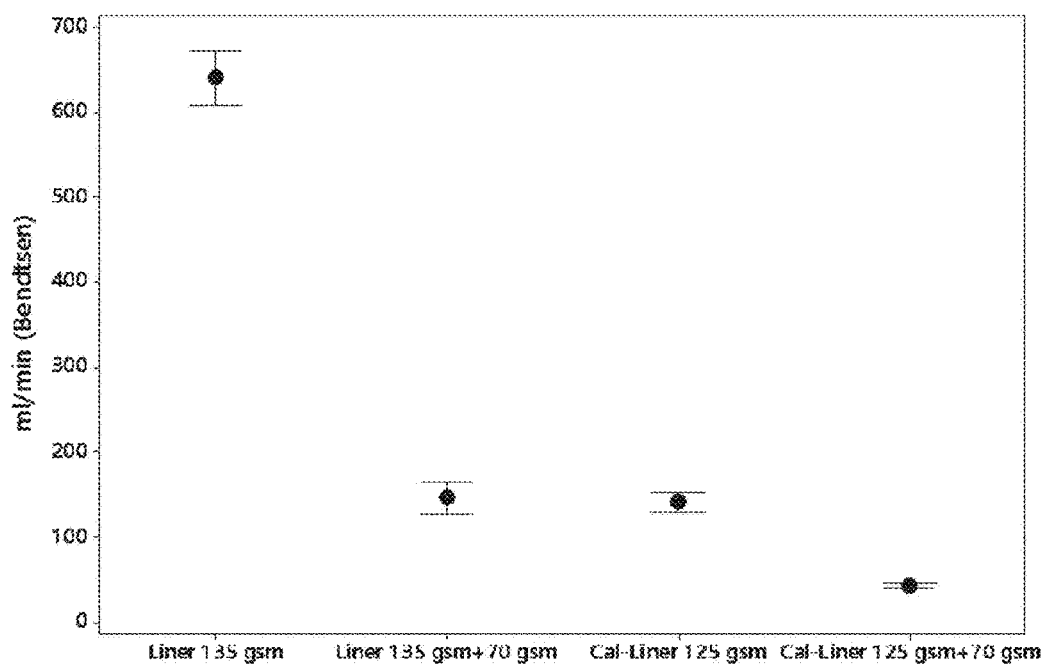

In the following, embodiments of the invention will be described with reference to the drawings, of which:

FIG. 1a is showing a schematic, cross-sectional view of a first laminated packaging material according to the invention, FIG. 1b shows a schematic, cross-sectional view of a further embodiment of a laminated packaging material according to the invention, FIG. 1c shows a schematic, cross-sectional view of another embodiment of a laminated packaging material according to the invention, FIG. 2a shows schematically a method step in accordance with the invention, for laminating a web of print substrate paper to a web of bulk material layer, FIG. 2b shows schematically a preferred example of a method, for laminating a barrier film or foil to a bulk layer in accordance with the invention, FIG. 2c shows schematically a further method step, for laminating an innermost thermoplastic polymer layer to a web comprising the laminated bulk material layer, e.g. the laminated web resulting from the method step described in FIG. 2a. Alternatively, FIG. 2c may describe a further method step for laminating an outermost thermoplastic polymer layer to the outer side of a web comprising the print substrate paper with a printed décor thereon, in accordance with the invention, FIG. 3a, 3b, 3c, 3d show typical examples of packaging containers produced from the laminated packaging material according to the invention, FIG. 4 shows the principle of how packaging containers may be manufactured from the packaging laminate in a continuous, roll-fed, form, fill and seal process, and FIG. 5 shows how the high surface roughness of a linerboard bulk material layer may be reduced to support a good print surface of the final laminated packaging material.

Figure 6:
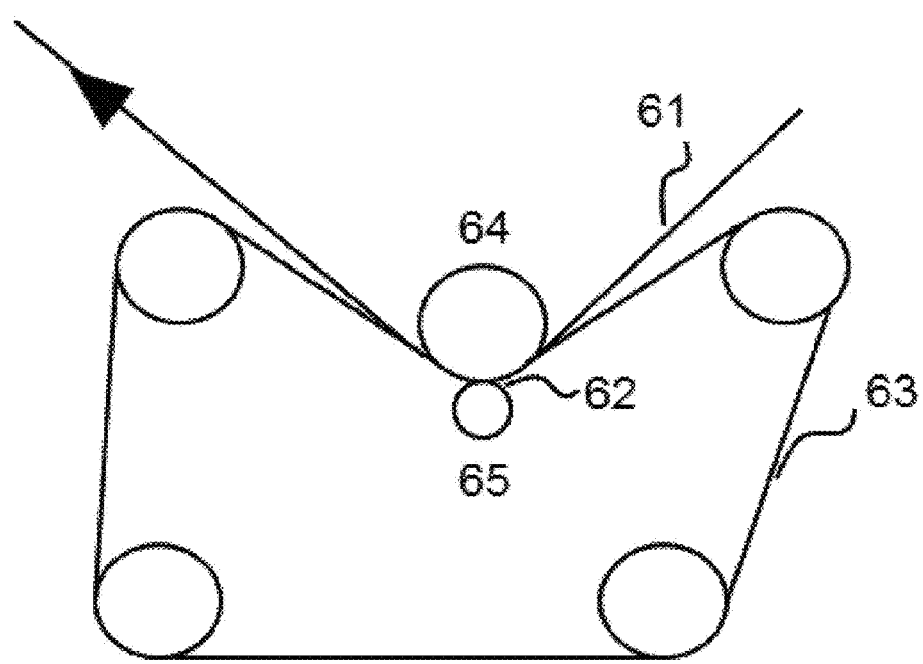

FIG. 6 shows the principle of a metal belt calendering operation.

TEST METHODS

Grammage or surface weight (in g/m$^2$) is determined according to ISO 536.

Bendtsen surface roughness may be measured by clamping a test piece between a flat glass plate and a circular metal head and measuring the rate of airflow in ml/minute between the paper and head. The Bendtsen technique is designed to work in the range 30-1500 ml/minute. Applicable test methods are BS 4420, ISO 8791/2, DIN 53108 and SCAN P21.

The Cobb test is used to determine the water absorptivity of paper, cardboard and corrugated cardboard. The Cobb Test is carried out according to the following standards: ISO 535, EN 20535 and TAPPI T 441. One Cobb unit is 1 g/m$^2$ (water) adsorbed onto the surface in 60 seconds while exposed to water. The Cobb value of a paper or paperboard is largely dependent on its degree of sizing. Other factors may play a role, such the degree of beating of the fibres in the pulp etc. In the print substrate papers that are suitable for the present invention, the Cobb value is mainly reflecting the degree of sizing of the paper. A quick version Cobb test may be done in half the absorption time above, i.e. at 30 seconds. The values then have to be adjusted to be comparable, i.e. doubled, but otherwise, the test is essentially the same.

Tensile strength is measured according to ISO 1924-3, the measured unit being kN/m and presented as a geometrical mean (GM) value between the values of machine direction (MD) and cross direction (CD). The tensile strength index of a cellulose material will be its tensile strength normalized by its surface weight. Thus, the tensile strength index is presented by the unit Nm/g (GM).

Tear strength is measured according to ISO 1974:2012, the unit being kN, also presented as GM value. The tear strength index is the value normalised by surface weight of the test sample, and presented by the unit mNm$^2$/g.

In FIG. 1a, there is thus shown a first embodiment of a laminated packaging material, 10a, of the invention. It comprises a bulk material layer 11a of a linerboard, having a surface weight of about 220 g/m$^2$, a density of 780 kg/m$^3$, an SCT index MD of 34 Nm/g, a Bendtsen value of 900 ml air/min, not yet calendered. By metal belt calendering at a surface temperature of about 200° C., and at high pressure in the metal belt nip, the surface roughness was reduced to 200 ml/min.

On the outer side of the bulk material layer 11a, the packaging material comprises a separate layer of a print substrate paper 12a. The print substrate paper has an outer surface for receiving and carrying a printed ink décor 12a-1, which is to provide the décor of the final packaging container made from the packaging material. In this embodiment, the print surface paper is a natural brown (unbleached) MG (machine-glazed) paper having a surface weight of 40 g/m², a density of 650 kg/m³, a Cobb value of 27 g/m² water, tensile strength index GM of 49 Nm/g and tear strength index of 6 mNm²/g.

The printed décor is protected towards the external surroundings of the package by an outermost liquid-tight and transparent layer 13a of an LDPE, which was extrusion coated onto the printed print substrate paper 12a, i.e. the print substrate paper is provided with a printed décorative pattern 12a-1.

The print substrate paper 12a is laminated to the bulk paperboard by a low amount of starch adhesive 16a at between 1 and 4 g/m².

On the inner side of the bulk material layer 11a, which side is to be directed towards the inside of a packaging container formed from the laminated material, the laminated material comprises an aluminium metal foil 14a. The aluminium metal foil has a thickness of 6.3 μm. The aluminium metal foil is laminated to the bulk material layer by a bonding layer 17a of 20 g/m² of LDPE adhering and thus contacting the bulk material paperboard.

Although the bulk material layer, i.e. the linerboard, is a cheap and more bulky layer than a conventional LPB paperboard, and providing less dimensional support to the packaging material, it may when laminated between the outer print substrate paper and the inside aluminium foil provide a sandwich layer contribution such that the resulting laminate has high and reliable bending stiffness, and in addition high compression strength.

On the opposite, inner side of the aluminium metal foil, there is an innermost, heat sealable thermoplastic layer 15a, which is also the layer of the packaging laminate that will be in direct contact with the filled food product in a final packaging container. The innermost, heat sealable polymer layer 15a is melt co-extrusion coated onto the aluminium foil together with an intermediate adhesive polymer layer of EAA 18a.

The lamination of the bulk material layer 11a and the aluminium metal foil 14a by extrusion lamination of the LDPE bonding layer 17a was done before the step of coextrusion coating of the innermost thermoplastic polymer layer 15a and the adhesive polymer layer 18a onto the aluminium metal foil.

The innermost thermoplastic polymer layer is a heat sealable polymer selected from polyolefins, such as polyethylenes, such as in this case a composition comprising a blend of a metallocene-catalysed linear low density polyethylene (m-LLDPE) and a low density polyethylene (LDPE). Alternatively, or also, the heat sealable material on the innermost side of the laminated packaging material may be divided in two part-layers of different kinds of polyethylenes, e.g. there may be a first intermediate layer of LDPE contacting the adhesive polymer layer and a second innermost layer of the above blend of mLLDPE and LDPE.

In FIG. 1b, a second embodiment of a similar laminated packaging material, 10b, is shown. The laminated material is principally the same as the material in FIG. 1a. A print substrate paper 12b, being a bleached white MG paper having a density of 785 kg/m³, a surface weight of 70 g/m², a Cobb value of 24 g/m², and a surface roughness on its outer side of 100 ml air/min (Bendtsen), a tear strength index GM of 7 mNm²/g and a tensile strength index of 60 Nm/g, to be printed with a printed décor 12b-1, is laminated on the outside of the bulk material layer 11b by a starch adhesive at from 1 to 4 g/m².

The bulk material layer is the same linerboard as used in connection with FIG. 1a, of which the surface roughness was reduced to 200 ml/min by calendering.

The gas barrier layer 14b is a substrate film 14b-1 of a biaxially oriented polyethylene terephthalate (BOPET) which has been coated with a nanometer-thin continuous coating 14b-2 of an amorphous diamond-like carbon coating (DLC) by means of plasma-enhanced chemical vapour deposition. The DLC coating is turned to be on the outer side of the BOPET film, and bonded to the bulk material layer by an intermediate bonding layer 17b of polyethylene. On its inner side, the BOPET film has a primer or adhesion promoting coating (not shown) to render its PET surface more compatible with extrusion-coated polyolefin based layers. The thus primed or treated BOPET film is co-extrusion coated on its inner side with an innermost layer 15b of a blend of an mLLDPE and an LDPE and an intermediate adhesive layer 18b of EAA.

Although the bulk material layer, i.e. the linerboard, is a cheap and more bulky layer than a conventional LPB paperboard, and providing less dimensional support to the packaging material, it may when laminated to the outer print substrate paper and the inside layers provide a sandwich layer contribution such that the resulting laminate anyway achieves a high and reliable bending stiffness, and in addition high compression strength.

FIG. 1c shows a third embodiment of a laminated packaging material according to the invention, 10c. The laminated packaging material has the same linerboard bulk layer 11c as in FIG. 1a and the same outer- and innermost thermoplastic polymer layers 13c and 15c as described in FIGS. 1a and 1b, but does not have a further gas barrier layer on the inner side of the bulk material layer.

Such laminates are for example suitable for chilled dairy products not needing very high gas barrier properties of the packaging material.

The laminated packaging materials 10a, 10b and 10c thus offer an opportunity for dairies and food fillers to easily differentiate food products and brands from each other by the exchangeable outside appearance of different print substrate papers having different print background effects.

FIG. 2a shows how a first web of the bulk material layer A, being a liquid-food grade paperboard, was laminated to a second web of the print substrate paper B by cold aqueous adhesive absorption lamination. A low amount of an aqueous adhesive solution is applied onto the non-print surface of the web of the print substrate paper B in an adhesive application operation 21. The wet coated web of the print substrate paper is laminated to the first web of the paperboard A at lamination operation 22 in a nip of two lamination rollers, the aqueous adhesive solution then being absorbed into one or both of the two paper surfaces while pressing and adhering them together, by simultaneously forwarding the webs through the lamination nip 22.

In FIG. 2b it is shown how the obtained web of the laminated layers AB in FIG. 2a is subsequently forwarded to a further lamination roller nip for lamination 25 to a third web C comprising a gas barrier layer, such as the aluminium foil of FIG. 1a, 14a, or the DLC-coated film of FIG. 1b, 14b.

Thus, the web of the semi-laminate AB and the web C comprising the gas barrier layer are forwarded to a lamination roller nip, while at the same time, a molten curtain of the thermoplastic bonding polymer 23 is extruded 24 down into the lamination roller nip and cooled while pressing the two webs together, such that sufficient adhesion is obtained between the surfaces of the two webs AB and C, i.e. between the inner surface of the bulk material layer and the outer surface of the barrier foil or film, to form a laminated web 26.

Alternatively, a cold aqueous adhesive absorption lamination method, as described in FIG. 2a, may be used when laminating the bulk material layer AB to the web C.

The method step of FIG. 2b is not needed in the case of the packaging material of FIG. 1c, which is then instead wound up onto a reel for intermediate storage or transport to a different time or place, where final lamination and finishing steps may take place.

In FIG. 2c it is principally shown how a web of the laminated print substrate paper and the bulk layer AB, or a web ABC of the bulk material layer, the print substrate paper and the gas barrier film or foil, resulting from FIG. 2a or 2b, respectively, is forwarded to a further lamination operation 27 at a roller nip. At the roller nip, a molten curtain 28 of the inside polymer layers, i.e. the adhesive polymer layer 18a; 18b; optionally 18c, and the innermost layer 15a; 15b; 15c, are co-extruded 29 down into the lamination roller nip, and being cooled to be coated as a multilayer film coating onto the inner side of the web AB or ABC, by pressing and solidifying the polymer layers 18, 19 to the inner surface. The resulting laminate 30 may be forwarded to a further, similar lamination operation for extrusion-coating lamination of the outside layer 13a, 13b, 13c of LDPE onto the opposite, outer side of the print substrate paper 12a, 12b, 12c or if this was already done before the above lamination steps, to a reeling station for winding onto a reel, for further transport and storage of the packaging laminate.

Figure 3A:
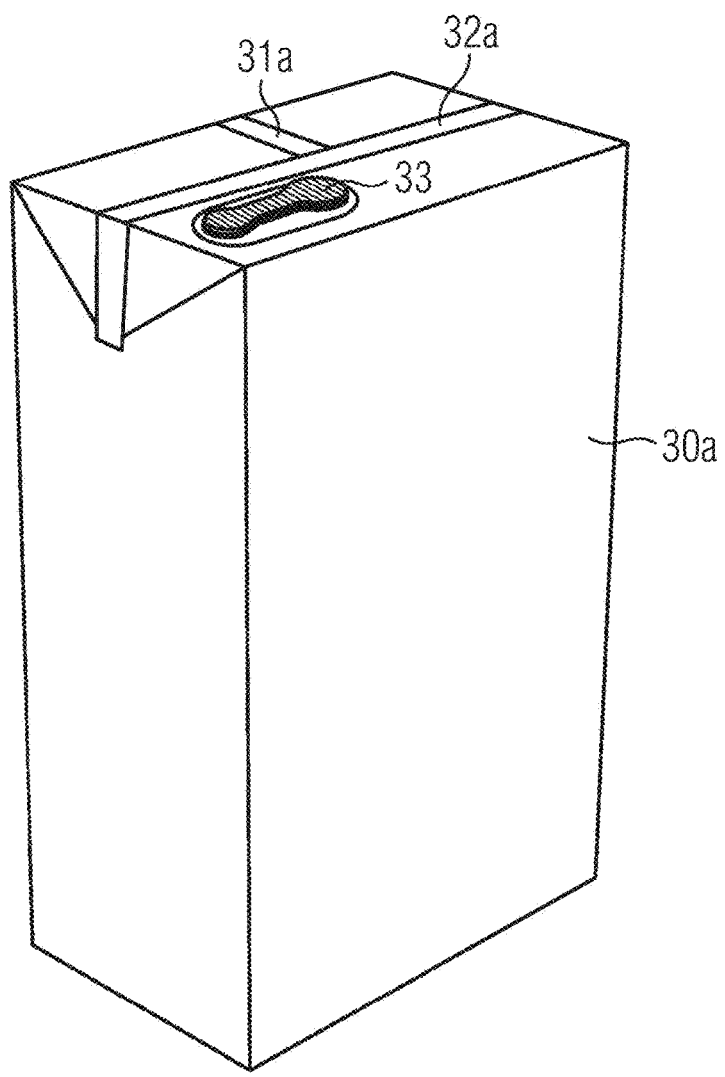

FIG. 3a shows an embodiment of a packaging container 30a produced from the packaging laminate 10a; 10b; 10c according to the invention. The packaging container is particularly suitable for beverages, sauces, soups or the like. Typically, such a package has a volume from about 100 to 1000 ml. It may be of any configuration, but is preferably brick-shaped, having longitudinal and transversal seals 31a and 32a, respectively, and optionally an opening device 33. In another embodiment, not shown, the packaging container may be shaped as a wedge. In order to obtain such a "wedge-shape", only the bottom part of the package is fold formed such that the transversal heat seal of the bottom is hidden under the triangular corner flaps, which are folded and sealed against the bottom of the package. The top section transversal seal is left unfolded. In this way the half-folded packaging container is still is easy to handle and dimensionally stable when put on a shelf in the food store or on a table or the like.

Figure 3B:
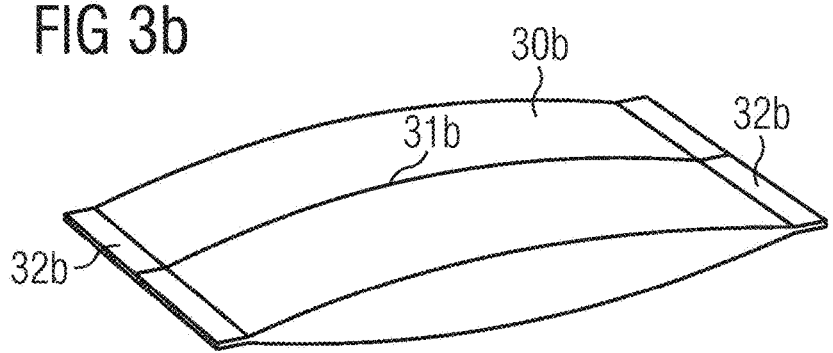

FIG. 3b shows an alternative, preferred example of a packaging container 30b produced from an alternative packaging laminate according to the invention. The alternative packaging laminate is thinner by having a thinner cellulose bulk layer, and thus it is not dimensionally stable enough to form a cuboid, parallellepipedic or wedge-shaped packaging container, and is not fold formed after transversal sealing 32b. It will thus remain a pillow-shaped pouch-like container and be distributed and sold in this form.

Figure 3C:
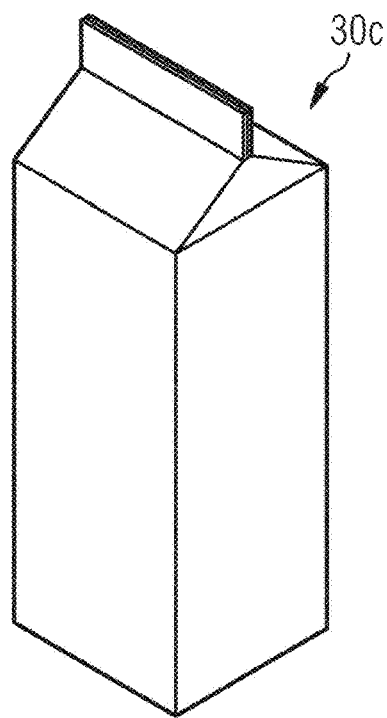

FIG. 3c shows a gable top package 30c, which is fold-formed from a pre-cut sheet or blank, from the laminated packaging material comprising a bulk layer of paperboard and the durable barrier film of the invention. Also flat top packages may be formed from similar blanks of material.

Figure 3D:
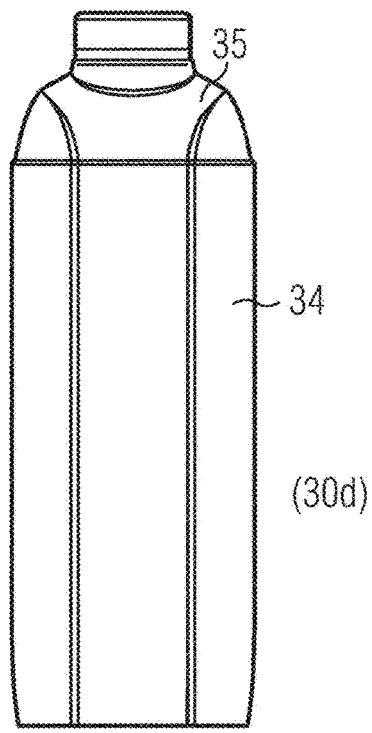

FIG. 3d shows a bottle-like package 30d, which is a combination of a sleeve 34 formed from a pre-cut blanks of the laminated packaging material of the invention, and a top 35, which is formed by injection moulding plastics in combination with an opening device such as a screw cork or the like. This type of packages are for example marketed under the trade names of Tetra Top® and Tetra Evero®. Those particular packages are formed by attaching the moulded top 35 with an opening device attached in a closed position, to a tubular sleeve 34 of the laminated packaging material, sterilizing the thus formed bottle-top capsule, filling it with the food product and finally fold-forming the bottom of the package and sealing it.

FIG. 4 shows the principle as described in the introduction of the present application, i.e. a web of packaging material is formed into a tube 41 by the longitudinal edges 42 of the web being united to one another in an overlap joint 43. The tube is filled 44 with the intended liquid food product and is divided into individual packages by repeated transversal seals 45 of the tube at a pre-determined distance from one another below the level of the filled contents in the tube. The packages 46 are separated by incisions in the transversal seals and are given the desired geometric configuration by fold formation along prepared crease lines in the material.

FIG. 5 shows the Surface Roughness values (Bendtsen ml air/min) of the different cellulose-based materials employed in the invention. A typical linerboard (SCA Kraftliner) having a surface weight of 135 g/m$^2$ and an SR value of 640 ml air/min, was laminated to a print substrate paper being a Flexible Packaging paper (Lennoflex from Feldmuehle) having a surface weight of 70 g/m$^2$, and an original measured surface roughness of the print surface of about 15 (marketed as 20) ml air/min. Lamination was carried out by means of an aqueous adhesive composition comprising starch, applied wet to yield a dry amount of about 1.4 g/m$^2$. The dry content of the aqueous composition was 16 wt %. The resulting surface roughness after lamination, of the print surface of the laminated print substrate paper, was then decreased to 146 ml air/min, which is, however, considered too high to be acceptable.

In a further experiment, the above linerboard was calendered in a metal belt calender at a nip load of 100 kN/m and a surface temperature of about 200° C. The resulting surface roughness on the metal belt side was 141 ml air/min, i.e. about the same as the previously described linerboard laminate. When instead laminating this calendered linerboard (the linerboard loses some surface weight at calendering due to loss of moisture, i.e. to instead have a surface weight of 125 g/m$^2$), to the same print substrate paper in the same way, the resulting surface acquired a roughness value of only 42 ml air/min, i.e. much less than half of the maximum acceptable value for a print substrate paper, i.e. 100 ml air/min, although the initial surface roughness value of the print substrate paper was the same in both experiments. Consequently, it is possible to obtain a print surface that is similar to, or even smoother than, conventional liquid packaging paperboard, such as a clay-coated Duplex LPB, by calendering a rough linerboard before laminating it to a print substrate paper. Furthermore, it is possible to obtain a sufficiently smooth print surface of the laminated print substrate paper and linerboard bulk material layer, to ensure that the metallised surface may maintain its mirror-like, smooth appearance, and not be negatively affected by the roughness of the different bulk material layer.

FIG. 6 shows the principle of a metal belt calendering operation. The containerboard 61, such as a linerboard, is forwarded into a nip 62 between a metal belt 63 and a metal roller 64, while pressure force is applied by a pressure roller 65 and while heat is supplied to the nip and the surface of the linerboard, by the heated metal roller 64. In heated roller calendering, usually directly applied in-line after the paper-manufacturing line (not shown here) the board is simply passing a series of heated hard pressure roller nips.

The invention is not limited by the embodiments shown and described above, but may be varied within the scope of the claims. As a general remark, the proportions between thicknesses of layers, distances between layers and the size of other features and their relative size in comparison with each other, should not be taken to be as shown in the figures, which are merely illustrating the order and type of layers in relation to each other all other features to be understood as described in the text specification.

The invention claimed is:

1. Laminated packaging material for packaging of liquid food, comprising a cellulose-based bulk material layer possessing an outer side, an outermost transparent and protective thermoplastic polymer layer arranged on an outside of the bulk material layer that is to be directed to the exterior of a packaging container made from the laminated packaging material, a decorative print pattern arranged between the bulk material layer and the outermost transparent and protective thermoplastic polymer layer, and visible through the outermost transparent and protective thermoplastic polymer layer, an innermost heat sealable and liquid-tight thermoplastic polymer layer, to be in direct contact with the liquid food in the packaging container, wherein the bulk material layer is a containerboard, which has been calendered to a Bendtsen outside surface roughness value lower than 200 ml air/min, and has an SCT index greater than 30 Nm/g in MD as determined in accordance with ISO 9895 and ISO 536 the outside surface of the containerboard having the Bendtsen outside surface roughness value lower than 200 ml air/min being the surface facing towards the outermost transparent and protective thermoplastic polymer layer, and wherein the laminated packaging material further comprises a cellulose-based print substrate paper, having an outside print surface carrying the decorative print pattern, the print substrate paper being adhered to the outer side of the bulk material layer by way of 1-4 g/m² adhesive, dry weight, the print substrate paper having a surface weight of 100 g/m² or lower (ISO 536), the outside print surface having a Bendtsen surface roughness value lower than 100 ml air/min (ISO 8791-2).

2. Laminated packaging material as claimed in claim 1, wherein a gas barrier film or foil comprising an oxygen barrier layer or coating is laminated on an inner side of the bulk material layer, between the bulk material layer and the innermost thermoplastic polymer layer.

3. Laminated packaging material as claimed in claim 1, wherein the bulk material layer has Bendtsen outside surface roughness lower than 150 ml air/min, before the bulk material layer is laminated to the print substrate paper.

4. Laminated packaging material as claimed in claim 1, wherein the outside print surface has a Bendtsen surface roughness value of below 80 ml air/min.

5. Laminated packaging material as claimed in claim 1, wherein the print substrate paper has a surface weight of lower than 80 g/m².

6. Laminated packaging material as claimed in claim 1, wherein the outside print surface has a Cobb value from 20 to 30 g/m² water.

7. Laminated packaging material as claimed in claim 1, wherein the print substrate paper has a density higher than 650 kg/m³, a surface weight of 100 g/m² or lower (ISO 536), a tensile strength index (GM) of at least 40 Nm/g and a tear strength index (GM) of at least 6.0 mNm²/g, and comprising at least one sizing agent at from 0.1 to 0.4 wt-%, the outside print surface having a Bendtsen surface roughness value lower than 100 ml air/min (ISO 8791-2), and a Cobb value greater than 20 g/m² and lower than 30 g/m² (water).

8. Laminated packaging material as claimed in claim 1, wherein the print substrate paper is a paper selected from the group consisting of MG (Machine Glazed) paper, MF (Machine Finished) paper, LWC (Light-weight coated) paper, Flexible Packaging paper, digital printing paper and ink jet printing paper.

9. Laminated packaging material as claimed in claim 1, wherein the outside print surface of the print substrate paper is metallised and has a Bendtsen surface roughness value lower than 100 ml air/min.

10. Laminated packaging material as claimed in claim 1, wherein the outside print surface of the print substrate paper is natural brown.

11. Liquid food packaging container comprising the laminated packaging material as defined in claim 1.

12. Method for manufacturing a laminated packaging material for packaging of liquid food, the method comprising a) providing a first web of a cellulose-based bulk material layer, being a calendered containerboard having a Bendtsen outside surface roughness value lower than 200 ml air/min, and an SCT index greater than 30 Nm/g in MD as determined in accordance with ISO 9895 and ISO 536, the outside surface of the containerboard having the Bendtsen outside surface roughness value lower than 200 ml air/min being the surface directed to an exterior of a packaging container made from the laminated material, b) providing a second web of a cellulose-based print substrate paper, having a surface weight of 100 g/m² or lower (ISO 536), and an outside print surface to carry a decorative print pattern, with a Bendtsen surface roughness value lower than 100 ml air/min (ISO 8791-2), c) applying an aqueous adhesive composition comprising an adhesive polymer at an amount from 1 to 4 g/m², dry content, onto at least one of the outside of the first web and the inside of the second web, the inside of the second wet being the surface directed to an interior of said packaging container made from the aminated material, d) forwarding the first and second webs, from step c), towards a pressure roller nip to join and laminate the first and second webs together by the interjacent aqueous adhesive composition while passing the nip, and while the aqueous adhesive composition is partly absorbed into a surface of at least one of the first and second webs, e) printing a décorative print pattern onto the outside print surface of the print substrate paper, f) laminating an innermost heat sealable thermoplastic polymer layer on the inner side of the first web of the bulk material layer, opposite the side of the print substrate paper, the innermost heat sealable thermoplastic polymer layer being the surface in contact with the liquid food in said packaging container made from the laminated material, g) laminating an outermost, transparent and protective thermoplastic polymer layer on the outer side of the second web of the print substrate paper that is opposite the side of the bulk material layer.

13. Method as claimed in claim 12, wherein step e) is carried out before steps c) and d), such that the print substrate paper is first printed with the décorative print pattern onto the outside print surface in a separate printing operation.

14. Method as claimed in claim 12, further comprising laminating a gas barrier film or foil comprising an oxygen barrier layer or coating on an inner side of the bulk material layer so that the gas barrier film or foil is between the bulk material layer and the innermost thermoplastic polymer layer.

15. Method as claimed in claim 12, wherein the bulk material layer is calendered to the Bendtsen outside surface roughness value lower than 200 ml air/min in a separate step before step a) at a nip load from 80 to 120 kN/m and a surface temperature above 200° C., and at a calendaring speed from 500 to 1200 m/min.

16. Method as claimed in claim 12, wherein the laminating of the outermost, transparent and protective thermoplastic polymer layer on the outer side of the web of the print substrate paper occurs before the laminating of the innermost heat sealable thermoplastic polymer layer on the inner side of the web of the bulk material layer, and the printing of the décorative print pattern onto the print surface of the print substrate paper occurs before the laminating of the outermost, transparent and protective thermoplastic polymer layer on the outer side of the web of the print substrate paper.

17. Laminated packaging material as claimed in claim 1, wherein the containerboard is linerboard.

18. Laminated packaging material as claimed in claim 1, wherein the containerboard is linerboard having a Cobb water adsorption value of lower than 35 $g/m^2$ measured in accordance with ISO 535.

19. Method as claimed in claim 12, wherein the containerboard is a flat linerboard having a Cobb water adsorption value of lower than 35 $g/m^2$ measured in accordance with ISO 535.

20. Method as claimed in claim 12, wherein the containerboard is linerboard.

* * * * *